July 27, 1943.  O. B. MEYERS  2,325,335
FILM FEEDING MECHANISM FOR MOVING PICTURE
CAMERAS AND PROJECTORS
Filed May 20, 1941
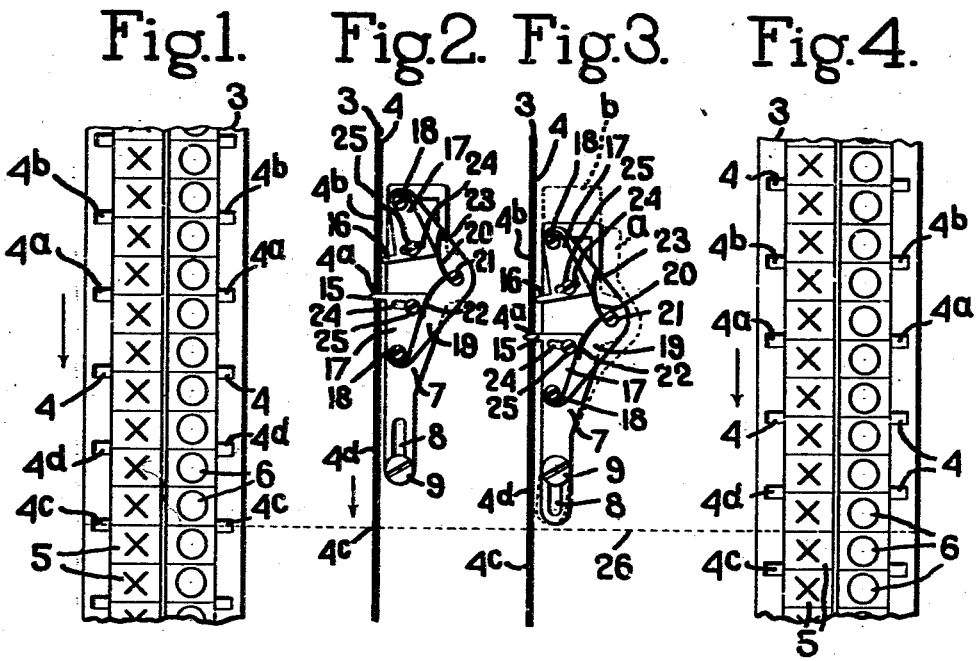
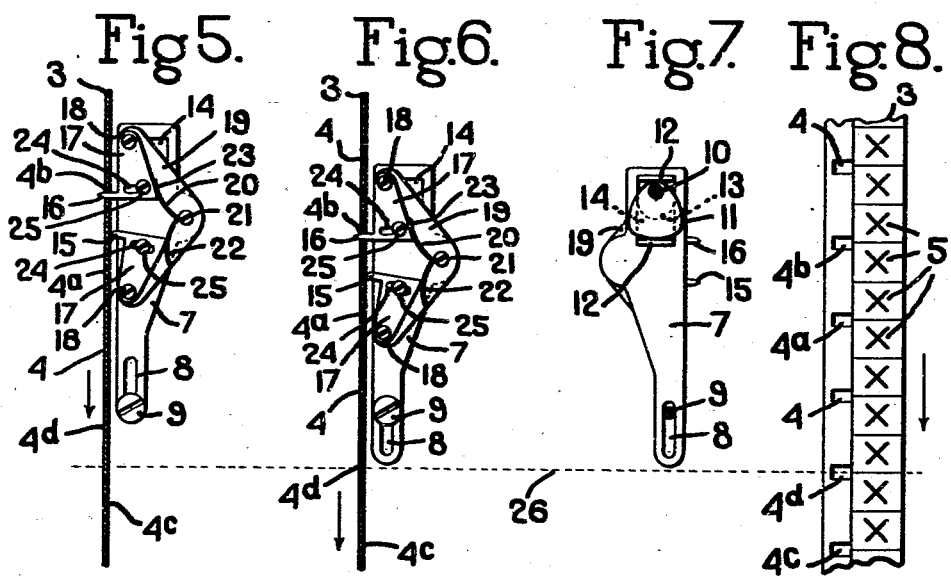
Inventor.
Otto B. Meyers
by Heard Smith & Tennant
Attys.

Patented July 27, 1943

2,325,335

UNITED STATES PATENT OFFICE 2,325,335

FILM-FEEDING MECHANISM FOR MOVING PICTURE CAMERAS AND PROJECTORS

Otto B. Meyers, Quakertown, Pa.

Application May 20, 1941, Serial No. 394,301

2 Claims. (Cl. 88—18.4)

This invention relates to film-feeding mechanism for motion picture cameras and projectors, and it has for its object to provide a novel film-feeding device by which a film that is perforated for a predetermined standard size of "frame" or picture area may be fed through the camera or projector at a rate of speed corresponding to "frames" or picture areas having a fractional part of the height of the predetermined "frame" or picture area.

As applied to a standard 16 mm. film, my invention makes it possible to feed such a standard 16 mm. film which is perforated for 16 mm. frames at a rate of speed corresponding to an 8 mm. film, that is, with a feeding motion in which each forward step is one half the length of that required for feeding a 16 mm. film carrying 16 mm. picture areas.

It is a more or less common practice to use a 16 mm. film for taking 8 mm. pictures. This is done by feeding the 16 mm. film through the camera at the 8 mm. rate and taking a row of 8 mm. pictures along one edge of the film, and when the film has been run through the camera, re-threading it and reversing it, and then taking a second row of 8 mm. pictures along the opposite edge of the film. In this way, the area of the 16 mm. film which normally constitutes one "frame" or picture area will contain four of the 8 mm. pictures. After the two rows of 8 mm. pictures have been thus taken on the 16 mm. film, then the latter is divided longitudinally along a median line, thereby severing the film into two films having an 8 mm. width, each film having a single row of apertures along one edge. These two half-width films are then joined together end to end to produce a continuous 8 mm. film carrying 8 mm. pictures.

Heretofore, feeding a 16 mm. film through the camera at the 8 mm. rate has necessitated providing the 16 mm. film with double the number of perforations required for taking 16 mm. pictures. In other words, it has been necessary to form the 16 mm. film with perforations properly spaced for feeding the film at the 8 mm. rate.

My invention provides means whereby a film perforated for 16 mm. pictures can be fed at a rate corresponding to that required in taking or projecting 8 mm. pictures, whether the film is of the full 16 mm. width and has a row of perforations on each edge or is a film formed by dividing the 16 mm. film longitudinally to produce a film of the 8 mm. width having a single row of perforations along one edge only.

This is accomplished by providing the film-feeding mechanism with a novel claw construction which cooperates with the perforations for the 16 mm. picture area to feed the film forward at the speed necessary in taking or projecting pictures with an 8 mm. film.

In order to give an understanding of the invention, I have illustrated in the drawing a selected embodiment thereof which will now be described, after which the novel features will be pointed out in the appended claims.

In the drawing:

Fig. 1 is a fragmentary enlarged view of a 16 mm. film which is perforated for taking or projecting 16 mm. pictures but which is illustrated as carrying two rows of 8 mm. pictures.

Fig. 2 is a side view of the film-feeding device with the film shown in sections, said view illustrating the position of the film-feeding mechanism at the beginning of a forward step.

Fig. 3 is a similar view illustrating the position of the parts after the forward step.

Fig. 4 is a view of the film showing its position relative to that shown in Fig. 1 after it has been fed forward.

Fig. 5 is a view similar to Figs. 2 and 3 but illustrating the position of the claw device at the beginning of the second forward step.

Fig. 6 is a view similar to Figs. 2, 3 and 5 illustrating the position of the parts at the end of the second forward step.

Fig. 7 is a fragmentary view illustrating a conventional means for giving the feeding member its reciprocatory and vibratory movement.

Fig. 8 is a fragmentary view of a film such as shown in Figs. 1 and 4 after it has been cut lengthwise to produce a film of the 8 mm. width.

Referring first to Fig. 1, 3 indicates a film of standard width which is provided with perforations 4 along each edge. Merely for the sake of illustration, it may be assumed that Fig. 1 illustrates a film having a 16 mm. width and having the perforations 4 properly spaced for taking pictures the full width of the film, or, in other words, taking what might be termed 16 mm. pictures. A 16 mm. picture on this film 3 would be one in which the picture area occupies the space between two adjacent perforations 4.

The film 3 is illustrated as carrying two rows of 8 mm. pictures, one row comprising the picture areas 5 along one edge of the film, and the other row comprising picture areas 6 along the other edge of the film, each picture area having a height corresponding to that of an 8 mm. film. There will, therefore, be four 8 mm. picture areas on the film 3 between each pair of adjacent perforations 4.

My improved film-feeding mechanism, by which the film 3 perforated for taking 16 mm. pictures may be fed at a rate required for taking 8 mm. pictures, whether the film is of the full 16 mm. width or is a film of 8 mm. width formed by dividing a 16 mm. film longitudinally, comprises the usual oscillatory or vibratory claw-carrying member and a double claw device carried by said member and arranged so that the claws are situated one above the other and act alternately during successive vibratory movements of the claw-carrying member, the two claws successively engaging each aperture in a single row of apertures along one edge of the film and each claw serving to feed the film forward a distance equal to one half that between adjacent perforations in the film. As a result, during two complete reciprocations of the claw-carrying member, the film will be fed forward a distance corresponding to that between adjacent perforations.

In the drawing, 7 indicates a claw-carrying member of any suitable or usual construction which is shown as provided with a slot 8 at one end in which is received a guiding screw 9 that is attached to any suitable or appropriate portion of the camera or projector.

Any suitable or usual means may be provided for giving the reciprocating member 7 a reciprocatory and oscillatory movement having an amplitude suitable for feeding an 8 mm. film. One conventional means for this purpose comprises a driving shaft 10 carrying a three-point cam 11 which operates between lips or flanges 12 struck up from the member 7, and a second cam 13 also mounted on said shaft 12 and operating in a slot 14 formed in the member 7.

The three-point cam 11 gives the reciprocating member 7 a feeding movement or a reciprocating movement in a direction parallel to the film, while the cam 13 gives the member 7 a vibrating movement toward and away from the film by which the claw device is brought into feeding engagement with the film at the beginning of the feeding stroke, and then is withdrawn from such engagement at the end of the feeding stroke. The member 7 will have a sliding and rocking engagement on the screw or pin 9.

Mounted on the reciprocating claw-carrying member 7 are two claws 15, 16, disposed one directly over the other, said claws being spaced apart a distance equal to one half the distance between the adjacent perforations 4 in the film 3.

The two claws 15 and 16 are movably mounted on the member 7 in such a way that each claw is permitted to move transversely of the member 7 or toward and from the film. This movement of the claws on the member 7 may be provided for in various ways, but I have herein shown each claw as having a shank or body portion 17 which is pivotally mounted at one end at 18, the other end of each body member having a film-engaging beak. These claws may be pivoted directly on the member 7, or, as herein shown, they may be pivotally mounted on a plate 19 which occupies a vertical plane at right angles to the film 3 and is secured to the reciprocatory member 7.

Each claw member is acted on by a suitable spring which tends normally to throw it forwardly into an operative position, and for this purpose, I have herein shown a spring member 20 secured to the plate 19 at 21 and having the two arms 22 and 23 bearing against the body portions 17 of the claw members 15 and 16 respectively. Each claw member is shown as having a slot 24 in which is received a screw 25 by which the swinging movement of the claw is limited.

Normally, therefore, the spring arms 22, 23 will hold both claws forwardly in their operative position, as shown by the claw 15 in Fig. 2.

The operation of my improved device in feeding the film 3 which is perforated for 16 mm. picture areas at the rate required for an 8 mm. film is as follows:

As stated above, the claws 15 and 16 are spaced apart a distance equal to one half the distance between any two adjacent perforations 4. When, therefore, the member 7 is at the beginning of its feeding stroke, one of the claws will enter an aperture in the film, as shown by the claw 15 in Fig. 2, the aperture which said claw has entered being designated as 4a, while the other claw 16 will engage the film between said aperture 4a and an adjacent aperture on the same edge of the film and will, therefore, be pressed back into an inoperative position against the action of its spring 23, as shown in Fig. 2.

During the forward feeding movement of the member 7, which is a downward direction in Fig. 2, the claw 15 will be operative to feed the film forward, and as the amplitude of reciprocating movement of the member 7 is equal to one half the distance between the perforations 4, the film will thus be fed forward a distance equal to one half of the distance between adjacent perforations 4, which is the distance required for the 8 mm. picture. At the end of the feeding movement, the feeding mechanism and the film are in a position shown in Figs. 3 and 4, Fig. 4 showing the film having been advanced from the position shown in Fig. 1 a distance equal to one half the distance between adjacent perforations 4. This is illustrated by comparing the two positions of the film in Figs. 1 and 4 with the horizontal dotted line 26. It will be observed that in Fig. 1 this horizontal line 26 is in line with one of the perforations 4, which may be referred to as perforation 4c, while in Fig. 4, the film has been advanced to a position where a point half way between the perforation 4c and the next following perforation 4 registers with this line 26.

At the end of the forward feeding movement, the member 7 is moved by the cam 13 backwardly into the dotted line position a, Fig. 3, to withdraw the claw 15 from the film and then the member 7 is moved upwardly to the upper end of its stroke by the cam 11 and is moved toward the film into the dotted line position b, Fig. 3, by the cam 13. The upward movement of the member 7 will bring the claw 16 opposite the aperture 4b, which is the next aperture beyond the aperture 4a on the same edge of the film as said aperture 4a, and, therefore, during the second feeding movement, the claw 16 will be operatively engaged in the aperture 4b, while the claw 15 will engage the film at a point midway between the apertures 4a and 4b and will be moved backwardly by the film into its inoperative position, shown in Fig. 5. During the second forward feeding movement of the member 7, the film will be fed forward by the claw 16 a distance equal to one half the distance between adjacent perforations 4, or what is the same thing a distance corresponding to that which an 8 mm. film is fed forward at each step, and will be brought to rest in a position in which said perforation 4b of the film occupies the position which was occupied by the perforation 4a in Fig. 1.

Figs. 5 and 6 illustrate the position of the film-feeding mechanism at the beginning and end of the second feeding stroke.

When the member 7 is again returned to its initial position for the third feeding stroke, the claw 15 will be in register with the aperture 4b, and during the third feeding stroke, said claw 15 will give the film a third forward step. During this third forward step, the claw 16 is forced backwardly to its inoperative position by its engagement with the film, as shown in Fig. 2, and the amplitude of movement of the third forward step will be that required for feeding an 8 mm. film.

During the fourth cycle of movement, the claw 16 will be operative, and the claw 15 inoperative, as shown in Figs. 5 and 6.

With my improvement, therefore, the two claws act successively in each aperture along one edge of the film, each claw serving to feed the film forward a distance equal to one half that between adjacent perforations. Or, stated another way, with my improved double claw mechanism, the claws act alternately on successive feeding movements, but on the same edge of the film, each claw feeding the film forward a distance suitable for the 8 mm. film, so that the successive movements given to the film by the two claws during two complete cycles of movement of the member 7 will feed the film forward a distance equal to the space between adjacent perforations 4. The construction above described, wherein the two claws 15, 16 are disposed one directly above the other and both claws operate in the same row of apertures 4, has the advantage that the device will operate equally well on a 16 mm. film of full width such as shown in Fig. 1 and which has a row of apertures along each edge and on a half-width film such as shown in Fig. 8 and which has been formed by dividing the full-width 16 mm. film longitudinally, and which therefore has a row of apertures 4 along one edge only.

My invention, therefore, if embodied in a camera designed to accommodate a 16 mm. film, can be used to take two rows of 8 mm. pictures on said film, and if embodied in a projector designed to take an 8 mm. film such as shown in Fig. 8, it can be used to project said film carrying the 8 mm. pictures.

While in order to give an understanding of the invention, I have referred above to 16 mm. and 8 mm. films, yet I wish it understood that the invention is not limited to use in connection with 16 mm. films but is capable for use with any standard film where it is desired to give the film a forward feeding movement at each cycle of operations, equal to a fractional part of the distance between adjacent perforations in the film. If such fractional part is one half the distance, then two claws such as herein shown and spaced apart equal to such one half distance will be used. But if the fractional part of the distance between adjacent perforations of the film which the film is to be fed forward is one third or one fourth of the distance, then a corresponding number of properly spaced claws on the member 7 will be necessary to secure the desired result.

My improved film-feeding device is equally applicable for use in motion picture cameras and in motion picture projectors.

When used in motion picture cameras, the resulting exposed film will be an 8 mm. film with the 16 mm. perforations, as shown in Fig. 8. If it is desired to use such an 8 mm. film in a projector which is not provided with my improved double claw feed mechanism, then, of course, it will be necessary to run the film through a perforator for the purpose of cutting therein additional perforations in order to provide the film with the necessary perforations for use in a regular 8 mm. projector. By equipping an 8 mm. projector, however, with my double claw mechanism herein illustrated, the exposed 8 mm. film, such as shown in Fig. 8, can be used in the 8 mm. projector.

I claim:

1. A film-feeding mechanism comprising a reciprocating claw-carrying member, means to reciprocate it with an amplitude of movement equal to one-half the distance between the perforations along one side of the film to be fed, a pair of claws independently pivoted on the claw-carrying member and situated one above the other in the same vertical plane, said claws being spaced apart a distance equal to the amplitude of the vibrating movement of the claw-carrying member, and spring means acting on said claws and yieldingly urging them towards the film to be fed, whereby upon successive reciprocations of the claw-carrying member, the claws will operate alternately with each perforation of the same line of perforations of the film to feed the latter forward with a step-by-step motion in which each step corresponds to one-half the distance between adjacent perforations in the film.

2. A film-feeding mechanism comprising a reciprocating claw-carrying member, means to reciprocate said member with an amplitude of movement equal to one-half the distance between the perforations along one edge of the film to be fed, a pair of claws each having a body portion pivoted at one end to the claw-carrying member and provided at the other end with a film-engaging beak, said claws being situated in the same vertical plane and oppositely disposed with the beak-carrying end of each claw directed toward the other claw and the pivoted end of each claw directed away from the other claw, and spring means acting on said claws and yieldingly urging them toward the film.

OTTO B. MEYERS.